United States Patent [19]

Stavish et al.

[11] 4,388,270

[45] Jun. 14, 1983

[54] RHENIUM-BEARING COPPER-NICKEL-TIN ALLOYS

[75] Inventors: Michael F. Stavish, Trumbull; Aldo M. Reti, Milford, both of Conn.

[73] Assignee: Handy & Harman, New York, N.Y.

[21] Appl. No.: 418,604

[22] Filed: Sep. 16, 1982

[51] Int. Cl.³ .............................. C22C 9/02; C22F 1/08
[52] U.S. Cl. .......................................... 420/473; 148/3; 148/160; 148/412
[58] Field of Search ................... 148/11.5 C, 12.7 C, 148/160, 411, 412, 414, 432, 433, 435, 3; 420/470, 473, 485, 488, 495

[56] References Cited

U.S. PATENT DOCUMENTS

| | | | |
|---|---|---|---|
| 4,012,240 | 3/1977 | Hinrichsen et al. | 148/12.7 C |
| 4,052,204 | 10/1977 | Plewes | 148/433 |
| 4,142,918 | 3/1979 | Plewes | 148/160 |
| 4,260,432 | 4/1981 | Plewes | 148/12.7 C |

*Primary Examiner*—Peter K. Skiff
*Attorney, Agent, or Firm*—Pennie & Edmonds

[57] ABSTRACT

A copper based alloy consisting essentially of about 4–15 wt. percent nickel, about 4–8 wt. percent tin, the balance essentially copper, to which was added to said copper, nickel and tin, prior to casting, about 0.002–0.4 wt. percent of rhenium. Improved grain structure in the as-cast metal, as well as a retained finer grain structure through homogenization anneals is realized. Finer grain structure after standard processing with attendant improved cold working characteristics, and improved strength for strip material made by standard processing procedures is also obtained. The invention is further directed to the method of producing the alloy.

33 Claims, No Drawings

RHENIUM-BEARING COPPER-NICKEL-TIN ALLOYS

BACKGROUND OF THE INVENTION

1. Field of the Invention

The present invention is directed to copper-nickel-tin alloy compositions containing rhenium as an additive and to the method of producing the alloy.

2. Description of the Prior Art

In 1933, J. T. Eash and C. Upthegrove presented a paper titled "The Copper-rich Alloys of the Copper-nickel-tin System", Transactions of the Institute of Metals Division, American Institute of Mining and Metallurgical Engineers, Volume 104, 1933, pp. 221-252. In that paper they stated that nickel additions to copper-tin bronzes produced better castings and also yielded alloys whose properties could be varied by precipitation hardening; and they also presented a series of quasibinary Cu-Ni-Sn phase diagrams to establish the alpha-phase boundaries in alloys containing from 0 to 20 percent nickel; they also stated equilibrium conditions which would exist in alloys containing up to 31 percent tin. In 1934, E. M. Wise and J. T. Eash, in a paper titled "Strength and Aging Characteristics of the Nickel Bronzes", Transactions of the Institute of Metals Division, American Institute of Mining and Metallurgical Engineers, Volume III, 1934, pp. 218-244, disclosed the age-hardening characteristics of the Cu-Ni-Sn alloys in wrought forms and further outlined solution heat treatments, effects of quenching, cold working and aging cycles which are required to achieve ultimate properties.

In the written discussions which are recorded at page 249 of the presentation of the work by Eash and Upthegrove in 1933, W. B. Price discussed the prior disclosure of the age-hardening capabilities for the Cu-Ni-Sn system, and also stated that the addition of other elements, such as Cr, Si, Mn, and Zn, in varying amounts from 0.2% to 2%, would improve strength or increase age-hardening.

Copper base alloys with nickel and tin are today generally known in the art to exhibit good combinations of strength and resistance to stress relaxation, particularly when the alloys are carefully processed under controlled conditions which serve to combine the effects of solution heat treatment, controlled quenching, cold reduction and aging so as to bring about a spinodal structure in the alloy.

It has heretofore been suggested that the best combination of properties could only be obtained when the recrystallized structure was controlled in such a manner so as to avoid large grain structure prior to cold rolling. Accordingly, several recent patents have issued which disclose not only various processing techniques but also the additions of Fe, Co, Zn, V, Cr, Si and other specific additives to the Cu-Ni-Sn alloys for the purpose of refining and controlling the grain size of these alloys both in the cast state as well as during subsequent recrystallization processing.

For instance, U.S. Pat. No. 3,941,620 to Pryor et al. discloses the additions of 0.1% to 3% Fe or Co to aid in grain refinement, while U.S. Pat. Nos. 4,052,204, 4,090,890, 4,130,421, 4,142,918 and 4,260,432 to J. T. Plewes state that Fe, Zr, Mn, Zn, Nb, Cr, Al, Mg, Mo, Ta and V, in the ranges of 0.02 to 10%, may be added to the Cu-Ni-Sn alloys as effective for producing a finer grain structure when incorporated with special heat treating cycles. U.S. Pat. No. 4,073,667 to Caron et al. also teaches that Zr, Hf, Be, Va, Nb, Ta, Cr, Mo, W, Zn and Fe may be added as element additions, in amounts of from 0.01% to 10%, to Cu-Ni-Sn alloys so as to obtain additional solution strengthening as well as work and precipitation hardening. It is also suggested that these additive elements may improve cold forming and wrought properties.

U.S. Pat. Nos. 3,937,638 and 4,012,240 also disclose a particular treatment process of Cu-Ni-Sn alloys which essentially involves homogenizing and cold working to obtain a predominantly spinodal structure in the treated alloy.

As noted, in these recent disclosures it has been proposed that a uniformly fine grain structure, whether induced by special heat treatment cycles or by alloy control, is desirable to enhance working of the cast metal. Also, where the finer grain is retained through processing and carried through to the finished product, it may impart improved properties and service life.

It has been observed, however, that the use of the specific additions to Cu-Ni-Sn alloys which are taught in the above disclosures nevertheless results in grain structure of the cast and worked alloys which is still relatively coarse, especially when the casting or pouring temperature is conducted in excess of 2350° F. This coarse grain is produced even in the presence of trace elements, such as Mg and Mn in quantities of 0.01%–0.15%, which have been mentioned in, for instance, U.S. Pat. Nos. 4,052,204 and 4,142,918 as effective in producing fine grain structure. Even finer grain structure in the as cast metal is desirable. It has also been found that additional improvements in the cold working characteristics of the resulting alloys made in accord with the discussed disclosures are desireable. Similarly, improvements in ultimate tensile and yield strength are also desired, particularly for strip material which is made by standard processing procedures. More particularly, improvements are desired for such alloys in the ability to obtain finer grain structure in the cast material, in the ability to retain the as-cast fine grain structure through the full solution heat treatment cycle, and also in the ability to obtain a fine recrystallized grain structure after a cold working operation, as well as the degree to which an annealed casting may be cold rolled without causing severe cracking, especially edge cracking.

SUMMARY OF THE INVENTION

Pronounced grain refinement effect and beneficial properties are obtained in a copper based alloy consisting essentially of about 4–15 percent nickel, about 4–8 percent tin, the balance essentially copper, to which was added about 0.002–0.4 percent of rhenium as an additive. The grain refinement effect and beneficial properties are particularly obtained wherein the residual rhenium present in the cast alloy is about 0.0005–0.05 percent. The present invention is also directed to a cast copper based alloy and to the spinodal copper based alloy and, further, to the method of producing the alloy.

All percentages recited herein are by weight.

DETAILED DESCRIPTION

Copper based alloys consisting essentially of about 4–15 percent nickel, about 4–8 percent tin, the balance essentially copper, wherein there has been added about 0.002–0.4 percent of rhenium as a grain refining element addition, preferably, to the molten bath of said copper-nickel and tin before casting, have been found to produce a reduction in the cast grain size and to cause a generally finer grain structure in the as-cast metal than that found in non-Re-bearing castings; the addition of the rhenium in accord with the present invention produces a generally uniform equiaxed grain structure instead of an undesirable columnar structure which is obtained when rhenium is not utilized.

While the invention is described preferably for a system which is 4–15 percent nickel and 4–8 percent tin, the balance essentially copper, it should be understood that improvements contemplated herein will be realized in any viable Cu-Ni-Sn system, including a system which is outside the preferred ranges described above.

The rhenium-bearing material in accord with the present invention also retains the comparative finer cast grain structure through homogenizing anneals-the finer recrystallized structure is also obtained in the rhenium-bearing alloy after cold rolling and annealing at times and temperatures normally recommended for standard processing of such Cu-Ni-Sn alloys.

Furthermore, castings to which rhenium have been added pursuant to the present invention are generally harder than non-rhenium bearing castings. Also, annealed castings with residual rhenium in accord with the present invention can be rolled to a greater reduction without severe cracking, particularly edge cracking, as compared to non-rhenium bearing castings.

The addition and incorporation of the rhenium within the Cu-Ni-Sn alloy also serves to yield a cold worked, annealed structure, pursuant to standard cold working and annealing cycles, which has a finer recrystallized grain structure.

In the same way, strip material from rhenium bearing castings, which had been cold worked and annealed, has a finer recrystallized grain structure than non-rhenium bearing strips which has been processed under the same conditions.

The effect of rhenium and the resultant finer grain structure is, as noted, to improve the cold working characteristics, and improve the ultimate tensile and yield strength for strip made by standard processing procedures.

As compared to other non-rhenium element additions, smaller additions of rhenium are required in order to obtain comparable results, and in fact superior results are obtained by the use of rhenium.

For instance, and as shown herein, it was determined that whereas the addition of only 0.005% or more rhenium elminated columnar grains and significantly reduced grain size in the as-cast alloy, 0.10% niobium or greater was required to produce the same results as obtained with 0.005% rhenium. Similarly, as much as 0.02 to 0.5% vanadium was needed to produce comparable results to that of 0.005% rhenium; and as much as 0.5% chromium gave uniform fine grain comparable to the use of only 0.005% rhenium—additions of up to 0.2% of chromium had little effect; zirconium in the range of 0.005 to 0.5% also was found to have little or no effect on the as-cast grain size.

Castings containing rhenium in accord with the invention also cold rolled with less edge cracking than did control castings that contained, for instance, Niobium. In the cold rolling of cast alloys of various compositions, including Cu-4 Ni-4 Sn, Cu-9 Ni-6 Sn, Cu-10 Ni-8 Sn and Cu-15 Ni-8 Sn, the rhenium bearing material in accord with this invention underwent a greater reduction without failure as compared to the non-rhenium containing alloy.

Additional specific advantages attendant in the use of rhenium as an additive, such as improved tensile strength properties, hardness, the ability of the material to retain the improved properties through subsequent processing, etc., will be further discussed herein and shown from the accompanying examples.

More particularly, the present invention contemplates the addition of from about 0.002–0.4 percent rhenium to a copper-nickel-tin alloy system wherein the resulting alloy will consist essentially of about 4–15 percent nickel, 4–8 percent tin, the balance essentially copper, as well as the residual rhenium. It is further contemplated in accord with the invention that the esidual rhenium that will be present in the alloy of the cast material will be about 0.0005–0.05 percent. That is, not all of the rhenium that is added to, for instance, the molten bath prior to casting will be actually present in the alloy, principally because of solubility considerations.

It has been found that small additions of rhenium, in the range of about 0.002 to 0.4 percent, preferably to the molten bath before casting, cause significant reduction in the cast grain size. The residual rhenium that is required to be present in the as-cast material in order to affect comparable results in grain size reduction, will vary with the composition of the basic Cu-Ni-Sn alloy. It has also been established in accord with this invention that the residual amount of rhenium present in the as-cast copper based alloy is dependent, in terms of the desired beneficial results, on the amount added to the melt.

For example, it has been found that in a Cu-4 Ni-4 Sn alloy system, the addition of about 0.002% rhenium to the bath produced only about 0.0005% residual rhenium in an as-cast alloy now having a fine grain structure-greater amounts of rhenium addition had no apparent effect on grain size, even though 0.005% addition left 0.001% residual and 0.2% addition left 0.002% residual.

Similarly, in a Cu-9 Ni-6 Sn alloy, the addition of about 0.005% rhenium produced about 0.003% residual rhenium, with the same improved fine grain size effect. Again, greater residual or additions had no apparent advantage.

In a Cu-10 Ni-8 Sn alloy system, the addition of about 0.005% rhenium left about 0.003% residual with the same fine grain size effects.

Likewise, in a Cu-15 Ni-8 Sn alloy system, the addition of about 0.005% rhenium left about 0.003% residual rhenium and provided fine grain; the addition of about 0.2% left about 0.046 residual rhenium in the as-cast alloy but there was no apparent advantage in terms of further improved grain size effect in the use of such a higher rhenium amount.

The present invention further contemplates the addition of rhenium to a Cu-Ni-Sn alloy system and its subsequent residual presence in both the cast material and in the spinodal alloy which obtains after appropriate processing. A spinodal structure in a copper-nickel-tin alloy is a recognized term in the art and refers to an alloy that has undergone spinodal decomposition in which, by appropriate processing, a Ni-Sn rich solid solution precipitate forms continuously and coherently within the copper matrix of the alloy.

General processing techniques for obtaining Cu-Ni-Sn alloys having a spinodal structure are known in the art and are disclosed, for instance, in the patents discussed above. The general methods disclosed in these patents are incorporated herein by reference. In this regard, it is a further feature of the present invention that conventional processing techniques, such as appropriate annealing, quenching, cold working and aging, may be applied to the rhenium-bearing melt and alloy of this invention so as to bring about the noted improvements not only in the as-cast alloy, but also in the subsequently processed alloy including also in the spinodal-structured alloy.

Thus, the present invention is further directed to a method of producing a copper based alloy consisting essentially of about 4–15 percent nickel, about 4–8 percent tin, the balance essentially copper, comprising adding to said copper, nickel and tin, prior to casting the alloy, about 0.002–0.4 percent rhenium, and thereafter casting the alloy. The invention is also directed to further processing the alloy by means of known processing techniques so as to achieve a spinodal structure.

Significant improvements especially in the grain structure of the cast and processed material are realized when the alloy of this invention is cast at temperatures above about 2350° F.

As noted, the rhenium may preferably be added to a molten bath of the copper, nickel and tin before casting the alloy, and yet further preferably after deoxidation of the bath. The rhenium may, however, be incorporated in the alloy by any means and may be added in any convenient form. It has been found that rhenium may be advantageously added to the molten bath as a 95% Ni+5% Re master alloy.

The molten baths and resulting alloys may also contain impurities and other additions which are typically encountered in the raw materials or otherwise usually incorporated in the alloy in the course of preparation of the alloy. For instance, Mn and Mg may be added to deoxidize the molten bath before casting.

The following examples, by no means limitive to the scope of the invention, are intended to demonstrate the benefits and advantages which are realized by the present invention.

General Test Procedure

All starting metals utilized herein were standard raw material which are normally used for product stock. These consisted of, for instance, elemental electrolytic copper, electrolytic Sn, and electrolytic Ni. In all cases 0.10% Mn and 0.15% Mg were added to deoxidize the molten metal before casting, or before the incorporation of grain refining element additions.

Typical impurities which were encountered in the control Cu-Ni-Sn melts which were employed herein include (the percentage amounts are maximum):
Silver—0.01%
Cadmium—0.01
Zinc—0.005
Lead—0.001
Iron—0.010
Aluminum—0.003
Magnesium—0.15
Silicon—0.003
Manganese—0.10
Indium—0
Bismuth—0.002
Mercury—0

The total percentage of the other impurities which might exist in the alloys would be expected to be less than about 0.10%.

Grain refiner elements to the molten baths were made after deoxidizing with Mg and Mn. Rhenium was introduced as a 95% Ni+Re master alloy; niobium as a 40 Ni-60 Nb master alloy; vanadium, also for comparative testing purposes, was added as a 56% Ni-44% V master alloy. Chromium and Zirconium, similarly for comparative testing purposes, were added as elemental metal powder contained in copper foil wrap. Each pre-weighed addition was placed in an inverted graphite cup which was then plunged below the surface of the molten bath and held until the added metal completely dissolved or melted. This was done to prevent loss of the additive metal and avoid possible oxidation before the element was within the bath. As noted, it is within the scope of the invention that other methods and/or other forms of the grain refining additive element material could be used.

Melting practices were also consistent. For each alloy and each additive element evaluated, melting was started with new crucibles, new stirring rods and new auxiliary equipment in order to avoid any cross-contamination.

In all tests, the copper and tin were melted without cover and heated to approximately 1960° F., after which a charcoal cover was added and nickel was introduced to the liquid bath. After the nickel had melted, the bath was heated to approximately 2350° F., and then 0.10% Mn was plunged below the bath surface and held until reaction stopped. Thereafter, 0.15% Mg was plunged below the bath surface and held until the reaction stopped. Where grain refining additives were to be added, they too were plunged below the surface as previously described and the molten bath was held for about 10 minutes before casting. Temperatures were held within ±50° F. of a desired 2400° F. target temperature.

The precise sequence and conditions for preparing the molten bath which are described above are not critical to the invention and may be varied, as is the casting operation described below and the subsequent processing operations elsewhere described.

Pouring was done through a protective flame of a slightly reducing gas to avoid oxygen contamination in the pouring stream. Several lower pouring temperatures were first evaluated to be certain that the effect of additions could be separated from the pouring temperature effects.

Molds were subsequently evaluated in order to show which could produce a combination of columnar and equiaxed grains somewhat similar to that which might be expected in production lots made on a continuous caster. A graphite base block was chosen to provide directional solidification.

In order to evaluate the as-cast structure, the initial test slugs were sometimes poured approximately 1" diameter × 3" high. Each slug was then sawed longitudinally down the middle, polished and chemically etched to reveal the cast structure. Photomicrographs at various magnifications were thereafter made.

Chemical analyses were measured by spectrographic analysis and X-ray fluorescence on sections taken from rolled stock.

EXAMPLE 1

Castings were made in accord with the above procedure in which 0.01% rhenium was added to the melt for purposes of comparison to melts in which no rhenium was added. The alloy was a Cu-15 Ni-8 Sn alloy; the residual amount of rhenium in the rhenium bearing casting was, in one case 0.005%, and in the other 0.008%; the former was made in the laboratory while the latter was cast on a conventional continuous caster.

After casting, the bars were solution heat treated at 1550° F. for 90 min. and quenched. Next, they were scalped from each major surface in preparation for cold rolling. Castings were then cold rolled to 0.200", then heat treated for 30 minutes at 1550° F. followed by water quench.

For purposes of evaluating the properties of the 94% cold worked samples, the samples were rolled directly to 0.012" thickness for test. Similarly, for purposes of evaluating annealed properties, 0.012" strip was annealed and water quenched. For the sake of comparatively testing various other processing conditions, the 0.200" stock was cold rolled to 0.050" and 0.020" gauge, re-solution heat treated and then lastly cold rolled to 0.012" test gauge.

Aging of the samples was performed in a laboratory salt bath with all samples for a specific set of conditions being treated as a unit. Aging temperature was about 350° C. and the time ranged was from ¼ hour to 24 hours.

Data measuring ultimate tensile strength (UTS), 0.05% yield tensile strength (0.05% YTS), and percent elongation in two inches (% El) of the variously processed alloy samples, both with and without rhenium addition, are presented in Tables I and II—Table I reports results for castings made in a laboratory while Table II reports the results obtained by the use of a conventional continuous caster. In most cases, a minimum of three tests were performed, often four tests, and the average measured results are reported.

In Table II, the tensile data are presented for samples taken from three castings made back-to-back on the conventional continuous caster; charge A was cast without rhenium while charges B and C had 0.01% rhenium added before transfer to the casting furnace.

The chemical composition of the test castings which were evaluated for the effect of residual rhenium is shown in Table III.

It will be noted from the results of Table I that the rhenium-bearing strip alloy material starts out higher than non-rhenium-bearing stock in terms of the measured strength properties and continues to be stronger through 1½ hours of aging (except for strip stock which was cold worked 94%).

After four hours at 350° C., the non rhenium-bearing material exhibited a drop in UTS and YTS while properties for the rhenium-bearing alloy continued to climb. After 24 hours at 350° C., both the rhenium and non rhenium-bearing materials over-aged; however, the rhenium-bearing strip gave generally higher properties.

TABLE I

Mechanical Properties of Cu-15 Ni-8 Sn Strip Processed From Laboratory Castings Made With and Without Rhenium Addition

| Test Condition | Non-Re Bearing | | | Re Bearing | | |
|---|---|---|---|---|---|---|
| | UTS (psi) | .05% YTS (psi) | % El | UTS (psi) | .05% YTS (psi) | % El |
| Annealed | 63,400 | 24,600 | 35 | 79,900 | 31,000 | 36 |
| Annealed +15 min. Age | 108,700 | 77,100 | 15 | 113,200 | 71,200 | 25.5 |
| Annealed +90 Min. Age | 121,200 | 86,700 | 11 | 133,800 | 99,500 | 15 |
| Annealed +4 hr. Age | 116,800 | 89,900 | 3.5 | 133,700 | 100,400 | 11 |
| 40% C.W. | 115,500 | 97,900 | 2.0 | 120,800 | 105,000 | 1.5 |
| 40% C.W. +15 min. Age | 136,200 | 121,000 | 4.0 | 141,500 | 123,000 | 6.0 |
| 40% C.W. +90 min. Age | 152,700 | 138,400 | 2.6 | 164,200 | 140,600 | 4.0 |
| 40% C.W. +4 hr. Age | 166,600 | 147,100 | 1.5 | 170,400 | 151,400 | 4.0 |
| 40% C.W. +24 hr. Age | 165,100 | 140,000 | 2.0 | 170,600 | 154,600 | 0.5 |
| 78% C.W. | 140,000 | 113,400 | 1.5 | 146,300 | 126,200 | 1.0 |
| 78% C.W. +15 min. Age | 165,100 | 148,900 | 2.0 | 175,600 | 157,900 | 1.5 |
| 78% C.W. +90 min. Age | 186,000 | 175,500 | 2.0 | 192,400 | 171,500 | 1.0 |
| 78% C.W. +4 hr. Age | 189,200 | 172,800 | 0.7 | 194,400 | 170,600 | 1.0 |
| 78% C.W. +24 hr. Age | 160,400 | 128,200 | 2.5 | 174,200 | 119,800 | 1.5 |
| 94% C.W. | 159,900 | 134,800 | 1.5 | 168,700 | 136,200 | 1.0 |
| 94% C.W. +15 min. Age | 183,500 | 167,800 | 1.0 | 192,100 | 175,800 | 1.0 |
| 94% C.W. +90 min. Age | 209,700 | 186,200 | 2.0 | 202,800 | 174,400 | 1.5 |
| 94% C.W. +4 hr. Age | 179,500 | 162,100 | 0.7 | 203,300 | 176,800 | 1.0 |
| 94% C.W. +24 hrs. Age | 162,500 | 123,000 | 1.0 | 178,700 | 125,200 | 1.5 |

TABLE II

Tensile Properties of Material Cast on a Conventional Continuous Caster

| Test Condition | Non-Re Bearing Charge A | | Re Bearing Charge B | | Re Bearing Charge C | |
|---|---|---|---|---|---|---|
| | UTS (psi) | .05% YTS (psi) | UTS (psi) | .05% YTS (psi) | UTS (psi) | .05% YTS (psi) |
| 78% C.W. | 139,800 | | 141,800 | | 137,700 | |
| | 140,800 | | 145,600 | | 140,700 | |
| | 139,700 | | 142,300 | | 144,500 | |
| | 138,900 | | 142,800 | | 144,500 | |
| | 140,600 | | 144,400 | | 139,000 | |
| | 136,300 | | 141,700 | | 145,200 | |
| Avg. | 139,400 | | 143,100 | | 141,900 | |
| 78% C.W. | 178,300 | 154,500 | 183,700 | 167,200 | 179,700 | 162,600 |
| +90 min. | 178,900 | 160,900 | 184,100 | 165,400 | 178,300 | 162,400 |

TABLE II-continued

Tensile Properties of Material Cast on a Conventional Continuous Caster

| | Non-Re Bearing | | Re Bearing | | | |
|---|---|---|---|---|---|---|
| | Charge A | | Charge B | | Charge C | |
| Test Condition | UTS (psi) | .05% YTS (psi) | UTS (psi) | .05% YTS (psi) | UTS (psi) | .05% YTS (psi) |
| Age @ 350° C. | 175,700 | 156,900 | 180,400 | 163,200 | 179,200 | 161,900 |
| | 179,500 | 162,800 | 182,000 | 166,100 | — | — |
| | 179,800 | 161,600 | 183,100 | 165,900 | — | — |
| | 180,800 | 161,600 | 179,700 | 165,400 | — | — |
| Avg. | 178,800 | 159,700 | 182,200 | 165,500 | 179,100 | 162,300 |

TABLE III

Chemical Compositions Of Test Castings Evaluated For Effect Of Rhenium (wt. %)

| | Castings of Table I | | Castings of Table II | |
|---|---|---|---|---|
| | Non-Re bearing | Re bearing | Non-Re bearing Charge A | Re bearing Charge B |
| Cu | 76.70 | 76.79 | 76.78 | 76.68 |
| Ni | 14.96 | 14.88 | 15.06 | 15.12 |
| Sn | 8.08 | 8.13 | 7.58 | 7.70 |
| Re | not added | .005 | not added | 0.008 |
| Nb | .04 | .05 | .015 | .015 |
| Mg | ND | .04 | .03 | .04 |
| Mn | .15 | .14 | .14 | .15 |
| Cd | ND | ND | ND | ND |
| Zn | ND | ND | ND | .003 |
| Pb | ND | ND | ND | ND |
| Fe | .005 | .005 | .02 | .05 |
| Al | ND | ND | ND | ND |
| Si | ND | ND | .01 | .03 |
| Bi | ND | ND | ND | ND |
| Ag | .01 | .01 | .17 | .19 |

ND: Non-detected

In addition to the beneficial strength properties for the rhenium bearing strip which are reported in Tables I and II, examination and photomicrographs of the as-cast material and of the processed strip material showed that (1) the addition of 0.01% rhenium produced a Cu-15 Ni-8 Sn casting with a finer grain structure than that without rhenium; and (2) the rhenium-bearing strip which was annealed after cold rolling to 0.200", 0.055", 0.020" and 0.012" developed smaller (0.025/0.035 mm) average grain size as compared to the non-rhenium strip (0.050/0.060 mm).

EXAMPLE 2

Melt charges containing various Cu-Ni-Sn Amounts and also various rhenium addition amounts were prepared as follows:

Each melt, approximately one pound, was made to the required wt. % from cathode copper, nickel shot, and electrolytic tin. 0.10 Mn and 0.15% Mg were added to all melts as deoxidizers just before adding the rhenium, or before casting if rhenium was to be omitted.

Each melt was made in a separate crucible in order to avoid contamination pickup. Melting was standardized as previously discussed, to wit: (1) the copper was melted without a cover; (2) tin was added; (3) a charcoal cover was next added; (4) at 2300° F. all of the nickel shot was added; (5) the melt was then reheated to 2350° F.; (6) Mn, Mg, and then rhenium were added; (7) the melt was subsequently reheated to 2350° F. and held for 10 minutes at temperature; and (8) the melt was then poured under a CO atmosphere into a 1" diameter by 4" long Fiberfrax mold which was held on a thick graphite base.

Each casting was subsequently sawed in half lengthwise for testing. One-half of each casting was tested in the as-cast condition; the second half was tested after solution annealing for a period of one hour and quenching. Photographs recorded both the as-cast and annealed grain patterns.

Rockwell Hardness readings were measured and are reported in Table IV, as is the percentage cold rolling that was required before severe cracking was observed.

An analysis of samples taken from the cold rolled strip, including the residual amount of rhenium, is listed in Table V.

TABLE IV

Rockwell (R30T) Hardness Of Castings Before And After Cold Working

| | | Hardness Of As-Cast Metal | Hardness Of Casting After Anneal | Cold Red. % On Casting After Anneal | Hardness Of Cold Rolled Metal |
|---|---|---|---|---|---|
| Cu-4 Ni-4 Sn | | | | | |
| Sample 1* | Control (0% Re) | 34/38 | 36/41 | 30 | 76/81 |
| 2* | .002% Re Added | 35/40 | 37/40 | 45 | 78/81 |
| 3* | .005% Re Added | 35/39 | 40/46 | 58 | 78/80 |
| 4* | .200% Re Added | 38/40 | 40/45 | 34 | 78/81 |
| Cu-9 Ni-6 Sn | | | | | |
| Sample 1 | Control (0% Re) | 48/51 | 45/47 | 35 | 80/82 |
| 2 | .002% Re Added | 45/50 | 46/50 | 41 | 82/84 |
| 3 | .005% Re Added | 54/56 | 49/53 | 38 | 81/82 |
| 4 | .200% Re Added | 56/59 | 49/51 | 42 | 82/84 |
| Cu-10 Ni-8 Sn | | | | | |
| Sample 1 | Control (0% Re) | 65/67 | 48/50 | 30 | 85/85 |
| 3 | .005% Re Added | 67/70 | 51/54 | 41 | 82/85 |
| Cu-15 Ni-8 Sn | | | | | |
| Sample 1 | Control (0% Re) | 71/76 | 54/57 | 16 | 85/86 |
| 2 | .002% Re Added | 67/75 | 53/56 | 35 | 84/86 |
| 4 | .200% Re Added | 67/70 | 54/59 | 43 | 86/86 |

*All #1 samples had "0" rhenium addition
*All #2 samples had .002% rhenium addition
*All #3 samples had .005% rhenium addition
*All #4 samples had .200% rhenium addition

TABLE V

Assays (Wt %) of Cu—Ni—Sn Alloys With Rhenium

| | | Cu | Ni | Sn | Mg | Mn | Re |
|---|---|---|---|---|---|---|---|
| 4-4 | 1 | 91.60 | 3.98 | 4.22 | .03 | .08 | — |
| | 2 | 91.62 | 3.99 | 4.21 | .02 | .08 | .0005 |

TABLE V-continued

| | | Assays (Wt %) of Cu—Ni—Sn Alloys With Rhenium | | | | | |
|---|---|---|---|---|---|---|---|
| | | Cu | Ni | Sn | Mg | Mn | Re |
| | 3 | 91.69 | 3.97 | 4.19 | .02 | .08 | .001 |
| | 4 | 91.52 | 4.10 | 4.24 | .04 | .06 | .002 |
| 9-6 | 1 | 84.57 | 8.91 | 6.19 | .03 | .10 | — |
| | 2 | 84.68 | 9.02 | 6.08 | .03 | .08 | .001 |
| | 3 | 84.62 | 8.95 | 6.16 | .04 | .09 | .003 |
| | 4 | 84.02 | 9.68 | 6.08 | .01 | .05 | .015 |
| 10-8 | 1 | 81.52 | 10.00 | 8.28 | .03 | .09 | — |
| | 3 | 81.47 | 9.92 | 8.35 | .06 | .07 | .003 |
| 15-8 | 1 | 76.74 | 14.84 | 8.23 | .05 | .10 | — |
| | 2 | 76.61 | 15.10 | 7.93 | .05 | .05 | .002 |
| | 4 | 76.62 | 15.00 | 8.08 | .04 | .04 | .046 |

It may be noted from Table V that residual rhenium varied for each alloy system. It has been found in this regard that the higher Ni-Sn appears to dissolve more rhenium. For example, in a 4 Ni-4 Sn alloy system, when 0.002% rhenium was added, the residual was close 0.0005%, with 0.005% rhenium added, the residual was 0.001% and with 0.2% rhenium added the residual was only slightly higher at 0.002%.

In the 9 Ni-6 Sn alloy system and in the 15 Ni-8 Sn alloy, the addition of 0.002% rhenium produced 0.001% and 0.002% residual rhenium; in the 9 Ni-6 Sn and 10 Ni-8 Sn alloy system, the addition of 0.005% rhenium produced 0.003% residual. With the addition of 0.2% rhenium, the residual in the 9 Ni-6 Sn system was 0.015%, but in the 15 Ni-8 Sn alloy system it was 0.046%.

Photomicrographs of each sample that were taken, showing the comparative cast grain size for varying additions of rhenium in each of the four alloy systems. The photomicrographs demonstrated that there was a significant reduction of the columnar grain and a general refinement in grain structure as compared to castings in which no rhenium was added.

Photomicrographs were, as noted, also taken of the structure of the cast samples after a full solution heat treatment. The 4 Ni-4 Sn alloy was solution heat treated for one hour at 1300° F. temperature followed by a direct water quench. The 9 Ni-6 Sn alloy was annealed at 1550° F. for one hour, 10 Ni-8 Sn and the 15 Ni-8 Sn were annealed at 1600° F. for one hour.

From the photomicrographs of the recrystallized microstructures of each of the systems after the cold rolling and annealing, it was observed that significant grain refinement was maintained in the processed alloys to which rhenium was added.

The results of this Example show that small additions of rhenium to melts of Cu-4 Ni-4 Sn, Cu-9 Ni-6 Sn, Cu-10 Ni-8 Sn and Cu-15 Ni-8 Sn caused a finer cast grain structure than that in non-rhenium bearing materials. More particularly, the as-cast structures of these alloys were affected as follows:

(1) Control samples of each alloy with 0% rhenium produced large columnar grains when cast at 2350° F.; and (2) Additions of 0.002 to 0.2% rhenium, which produced 0.0005% to 0.046 residual rhenium depending on the alloy system, reduced or eliminated columnar growth and reduced the general grain size in all systems.

Specifically by alloy, the results on the as-cast structure showed that:

(1) In 4 Ni-4 Sn an addition of 0.002% rhenium resulted in 0.0005% residual rhenium. This residual was effective in eliminating the columnar grains with general grain refinement;

(2) In 9 Ni-6 Sn, the addition of 0.002% rhenium resulted in 0.001% residual rhenium. Columnar grain size was reduced but not eliminated; equiaxed grains were finer. An addition of 0.005% rhenium with a residual of 0.003% was needed to eliminate the columnar grains in the castings;

(3) In 10 Ni-8 sn 0.005% rhenium addition with a 0.003% residual eliminated the columnar grains; and (4) In 15 Ni-8 sn, 0.002% rhenium added had very little effect on the cast structure. However, with 0.005% rhenium added and a residual of 0.004% rhenium, columnar grains were eliminated.

Similarly, the cold working & annealed structures of the alloys of this example were affected as follows:

(1) Generally, the rhenium bearing annealed castings rolled to lighter gauges before edge cracking developed;

(2) Strip cold rolled from annealed castings and annealed for fifteen minutes at temperatures suitable for solution treatment of the alloy had a finer grain than the non-rhenium bearing stock;

(3) It was also demonstrated that rhenium-bearing material which was cold rolled at least 75%, and subjected to standard annealing cycles, had a finer recrystallized grain than did the strip produced from non rhenium-bearing control stock; and (4) Rockwell R30T hardness readings on annealed castings showed a higher hardness in the rhenium-bearing alloys.

EXAMPLE 3

It was also shown through comparative testing on Cu-15 Ni-8 Sn alloy that smaller additions of rhenium are needed to reduce the grain size of the as-cast alloy than are obtained with other grain refining element additives, such as Nb, V, Cr and Zr. The elements and additions studied included:

Nb—0.001, 0.005, 0.01, 0.05, 0.1, 0.2, 0.3 and 0.4%
V—0.005, 0.01, 0.02, 0.05 0.1, 0.2 0.3, 0.4 and 0.5%
Cr—0.005, 0.01, 0.05 0.2, and 0.5%
Zr—0.01, 0.05, 0.2 and 0.5%
Re—0.001, 0.002, 0.005, 0.01, 0.02, 0.04, 0.08 0.15, 0.2, 0.3 and 0.4%

The above melts were prepared and cast as previously described; the pouring temperature was uniform at 2350° F. Control samples containing no grain refining element additions were also prepared and cast. Subsequent to casting, photomicrographs were taken of each cast structure in order to observe the grain size of the as-cast structure. The following was observed:

(a) Control samples poured at 2350° F. exhibited columnar grains;

(b) Rhenium additions of 0.005% or greater reduce columnar growth, and reduce general grain size in laboratory castings, to produce a fine equiaxed grain structure. 0.01% rhenium addition was required to obtain similar refined grain in production castings;

(c) Niobium additions of 0.05% and higher are necessary for complete refinement of cast structure. Additions of 0.01% Nb have only a small effect;

(d) 0.005% rhenium addition is as effective as 0.10% Nb;

(e) Vanadium additions of 0.02% to 0.5% gave uniform fine grain structure. 0.01% V had some effect but was less uniform than 0.02%;

(f) Chromium additions of up to 0.2% had little or no effect on cast structure. However, 0.5% Cr addition gave a uniform fine structure; and (g) Zirconium additions in the range of 0.005 to 0.5% had little or no effect on the cast grain structure.

EXAMPLE 4

When the control samples of the Cu-15 Ni-8 Sn alloy of Example 3 were poured at 2050° F. and 2150° F., into Fiberfrax or graphite molds, the cast material was then shown by photomicrographs to have a fine, equiaxed grain structure. When, however, the control samples were poured at 2350° F. and 2450° F., the cast material was shown to have unsatisfactory columnar grains. Subsequently, when as little as 0.005% rhenium was added to the melt of this alloy prior to pouring (casting), the columnar growth and general grain size was greatly reduced. The same dramatic changes in cast structures have been observed in the other Cu-Ni-Sn alloys of the present invention.

The foregoing demonstrates the advantages of the present invention when the copper based alloy is poured or cast at a temperature of above about 2350° F. Commercial productions of such alloys are typically carried out at melt temperatures above about 2350° F. thus demonstrating the advantages of the present invention in commercial application.

EXAMPLE 5

A melt for a Cu-15 Ni-8 Sn was prepared as above described. To this melt was added 0.01% rhenium as a 95% Ni-5%Re master alloy, and the melt was cast as also previously described to a continuous bar size of 1"×6". The cast alloy was thereafter processed by means of the following steps:

(a) The alloy was first hot rolled to 0.650";
(b) It was thereafter solution heat treated at 1625° F. for 90 minutes under $N_2$, and then quenched in water;
(c) It was next scalped;
(d) It was then cold rolled to 0.118";
(e) It was then solution heat treated at 1625° F. for a period of 30 minutes, and then $H_2O$ quenched; and
(f) It was finally cold rolled to 0.028" (76% cold working reduction).

The following properties were measured for the above processed rhenium bearing alloy:

|  | UTS (psi) | .05% YTS (psi) | Bends* (inches) |
|---|---|---|---|
| Test 1 | 183,700 | 168,000 | .080 |
| 2 | 188,200 | 171,600 | .095 |
| 3 | 183,200 | 168,300 | .067 |
| 4 | 182,700 | 167,000 | .063 |

*Refers to in-plane transverse bends before aging; a measurement of deflection.

For comparison purposes, an alloy containing 0.1 niobium (and no rhenium) was similarly cast and processed, except that it was finally cold rolled to 0.025" with a 78% cold working reduction. The following properties were measured:

|  | UTS (psi) | .05% YTS (psi) | Bends (inches) |
|---|---|---|---|
| Test 1 | 179,200 | 163,400 | .045 |
| 2 | 178,300 | 160,300 | .047 |
| 3 | 178,800 | 160,700 | .050 |
| 4 | 178,200 | 160,800 | .062 |

The above, as well as the results of Example 1, demonstrate that tensile properties including ultimate tensile, 0.05% offset yield strength and formability, as measured by in-plane transverse bends, were higher in the rhenium-bearing Cu-15 Ni-8 Sn alloy strip than in the non-rhenium strip; there is also a tendency for rhenium-bearing stock to have a higher as-cast hardness and tensile strength and to retain these higher properties through subsequent processing. The same beneficial results were obtained in the other Cu-Ni-Sn alloys in accordance with this invention.

We claim:

1. A copper based alloy consisting essentially of about 4-15 percent nickel, about 4-8 percent tin, the balance essentially copper, to which was added about 0.002-0.4 percent of rhenium.

2. A cast copper based alloy consisting essentially of about 4-15 percent nickel, about 4-8 percent tin, the balance essentially copper, to which was added about 0.002-0.4 percent of rhenium.

3. A copper based alloy having a spinodal structure consisting essentially of about 4-15 percent nickel, about 4-8 percent tin, the balance essentially copper, to which was added about 0.002-0.4 percent of rhenium.

4. The copper based alloy of claims 1, 2 or 3 wherein the residual rhenium present in the alloy is about 0.0005%-0.05 percent.

5. The copper based alloy of claims 1, 2 or 3 wherein the rhenium was added to a molten bath of said copper, nickel and tin prior to casting the alloy.

6. The copper based alloy of claims 1, 2 or 3 wherein the nickel is 4 percent, the tin is about 4 percent and to which was added about 0.002 percent rhenium.

7. The copper based alloy of claim 6 wherein the residual rhenium present in the alloy is about 0.0005 percent.

8. The copper based alloy of claims 1, 2 or 3 wherein the nickel is about 9 percent, the tin is about 6 percent and to which was added about 0.005 percent rhenium.

9. The copper based alloy of claim 8 wherein the residual rhenium present in the alloy is about 0.003 percent.

10. The copper based alloy of claims 1, 2 or 3 wherein the nickel is about 10 percent, the tin is about 8 percent and to which was added about 0.005 percent rhenium.

11. The copper based alloy of claim 10 wherein the residual rhenium present in the alloy is about 0.003 percent.

12. The copper based alloy of claims 1, 2 or 3 wherein the nickel is about 15 percent, the tin is about 8 percent and to which was added about 0.005 percent rhenium.

13. The copper based alloy of claim 12 wherein the residual rhenium present in the alloy is about 0.003 percent.

14. The copper based alloy of claims 1, 2 or 3 wherein was added about 0.002-0.005 percent rhenium.

15. The copper based alloy of claims 1, 2 or 3 in which the alloy was cast at a temperature above about 2350° F.

16. The copper based alloy of claims 1, 2 or 3 wherein the alloy further contains impurities.

17. The copper based alloy of claims 1, 2 or 3 wherein the alloy further contains deoxidants.

18. A method of producing a copper based alloy consisting essentially of about 4-15 percent nickel, about 4-8 percent tin, the balance essentially copper, comprising adding to said copper, nickel and tin, prior to casting the alloy, about 0.002-0.4 percent of rhenium, and thereafter casting the alloy.

19. The method of claim 18 which comprises further processing the alloy to achieve a spinodal structure.

20. The process of claim 18 wherein the rhenium is added to a molten bath of said copper, nickel and tin.

21. The method of claim 18 wherein the alloy is cast at above about 2350° F.

22. The method of claim 18 wherein the residual rhenium present present in the alloy is about 0.0005%-0.05 percent.

23. The method of claim 17 wherein the nickel is 4 percent, the tin is about 4 percent and to which was added about 0.002 percent rhenium.

24. The method of claim 23 wherein the residual rhenium present in the alloy is about 0.0005 percent.

25. The method of claim 18 wherein the nickel is about 9 percent, the tin is about 6 percent and to which was added about 0.005 percent rhenium.

26. The method of claim 25 wherein the residual rhenium present in the alloy is about 0.003 percent.

27. The method of claim 18 wherein the nickel is about 10 percent, the tin is about 8 percent and to which was added about 0.005 percent rhenium.

28. The method of claim 27 wherein the residual rhenium present in the alloy is about 0.003 percent.

29. The method of claim 18 wherein the nickel is about 15 percent, the tin is about 8 percent and to which was added about 0.005 percent rhenium.

30. The method of claim 29 wherein the residual rhenium present in the alloy is about 0.003 percent.

31. The method of claim 18 wherein was added about 0.002-0.005 percent rhenium.

32. The method of claim 18 wherein the alloy further contains impurities.

33. The method of claim 18 wherein the alloy further contains deoxidants.

* * * * *